(12) United States Patent
Smith

(10) Patent No.: US 6,297,749 B1
(45) Date of Patent: Oct. 2, 2001

(54) EMERGENCY OPERATING SYSTEM FOR PILOTING AN AIRCRAFT IN A SMOKE FILLED COCKPIT

(76) Inventor: Eric S. Smith, 3 Westfield Ct., Princeton, NJ (US) 08540

( * ) Notice: Subject to any disclaimer, the term of this patent is extended or adjusted under 35 U.S.C. 154(b) by 0 days.

(21) Appl. No.: 09/187,356

(22) Filed: Nov. 6, 1998

(51) Int. Cl.$^7$ .................................................. G01C 21/00
(52) U.S. Cl. .............................................. 340/980; 345/8
(58) Field of Search .................... 340/980, 973; 345/7, 8, 9

(56) References Cited

U.S. PATENT DOCUMENTS

| | | | |
|---|---|---|---|
| 3,574,283 | * 4/1971 | Albers | 340/980 |
| 3,947,815 | 3/1976 | Muncheryan | 340/575 |
| 4,606,073 | 8/1986 | Moore | 455/89 |
| 4,832,287 | * 5/1989 | Werjefelt | 244/118.5 |
| 4,969,714 | 11/1990 | Fournier, Jr. et al. | 353/174 |
| 5,113,177 | 5/1992 | Cohen | 340/980 |
| 5,138,555 | 8/1992 | Albrecht | 340/980 |
| 5,200,856 | 4/1993 | Beaussant | 359/630 |
| 5,227,769 | 7/1993 | Leksell et al. | 340/980 |
| 5,296,854 | 3/1994 | Hamilton et al. | 340/980 |
| 5,357,263 | 10/1994 | Fischer et al. | 345/9 |
| 5,519,410 | * 5/1996 | Smalanska et al. | 345/7 |
| 5,612,687 | * 3/1997 | Cescon et al. | 340/980 |
| 5,630,412 | * 5/1997 | Dubruille et al. | 128/206.23 |

* cited by examiner

Primary Examiner—Brent A. Swarthout
(74) Attorney, Agent, or Firm—Mathews, Collins, Shepherd & Gould, P.A.

(57) ABSTRACT

A system for operating equipment, aircraft or other like vessels in a smoke filled environment. The system includes a face mask configured to surround a user's eyes and form an airtight seal against the user's face. The mask includes a screen viewable by the user for displaying critical operating system information that permits continued operation of the equipment or aircraft. A signal path means provides the display screen with appropriate signals from instrument display sources of the equipment or aircraft. One embodiment of the system includes a hand-operated communication device that enables non-verbal communication with others. Another embodiment of the system includes independently powered backup instruments covering minimum critical equipment or aircraft operating conditions. The backup instruments would be coupled to the mask by the signal path means in the event that the equipment or aircraft's instruments should become inoperable due to fire and/or electrical power interruption. Still another embodiment of the system includes a respirator which is integral with the mask and provides oxygen to the user.

5 Claims, 3 Drawing Sheets

EMERGENCY OPERATING SYSTEM FOR PILOTING AN AIRCRAFT IN A SMOKE FILLED COCKPIT

FIELD OF THE INVENTION

This invention relates to aircraft operating systems, and in particular, to an emergency operating system for piloting an aircraft in a smoke filled cockpit.

BACKGROUND OF THE INVENTION

Smoke and/or fires in aircraft are reported weekly in the United States. It has recently been suggested that a majority of these fires may result from the thermal insulation lining the fuselage of the aircraft and the electrical insulation employed in the electrical wiring of the aircraft.

In many instances, the smoke and/or fire occurs in the cockpit of the aircraft or is circulated there. The smoke is often dense enough to substantially reduce or eliminate the pilot's view of the instruments, the pilot's view through the windscreen of the aircraft, and the pilot's ability to communicate by radio with air-traffic controllers, thereby, making it difficult or impossible to pilot the aircraft. This typically causes an uncontrolled crash landing of the aircraft which unfortunately, maximizes casualties and property losses.

Pilot helmets with visors capable of providing instrumentation and video displays have been developed for various purposes. For example, U.S. Pat. No. 5,113,177 discloses a pilot helmet having a visor display system that enables a pilot to simultaneously view an image of selected display information and scene external to the aircraft during low visibility flight conditions, such as at night. U.S. Pat. No. 5,296,854 discloses a pilot helmet having a visor display system that enable a pilot to view a video image based upon virtual images of the external world in low visibility flight conditions.

These and other similar helmet designs allow air to freely flow in the space between the visor and the pilot's face. In smoke-filled cockpit conditions, this space can quickly fill with smoke thus, rendering such helmets unusable for piloting the aircraft.

Accordingly, a need exists for an emergency operating system that permits a pilot in a smoke-filled cockpit environment to view minimum aircraft operating system information and external aircraft image scenes, and communicate with air-traffic controllers.

SUMMARY

A system for operating equipment, aircraft or other like vessels in a smoke filled environment. The system comprises a face mask configured to surround a user's eyes and form an airtight seal against the user's face. The mask includes a screen viewable by the user for displaying critical operating system information that permits continued operation of the equipment or aircraft. A signal path means provides the display screen with appropriate signals from instrument display sources of the equipment or aircraft.

One embodiment of the system includes a hand-operated communication device that enables non-verbal communication with others. Another embodiment of the system includes independently powered backup instruments covering minimum critical equipment or aircraft operating conditions. The backup instruments would be coupled to the mask by the signal path means in the event that the equipment or aircraft's instruments should become inoperable due to fire and/or electrical power interruption. Still another embodiment of the system includes a respirator which is integral with the mask and provides oxygen to the user.

BRIEF DESCRIPTION OF THE DRAWINGS

The advantages, nature, and various additional features of the invention will appear more fully upon consideration of the illustrative embodiments now to be described in detail in connection with the accompanying drawings wherein.

It is to be understood that these drawings are for purposes of illustrating the concepts of the invention and, except for graphical illustrations, are not to scale.

DETAILED DESCRIPTION OF THE INVENTION

Figure 1:
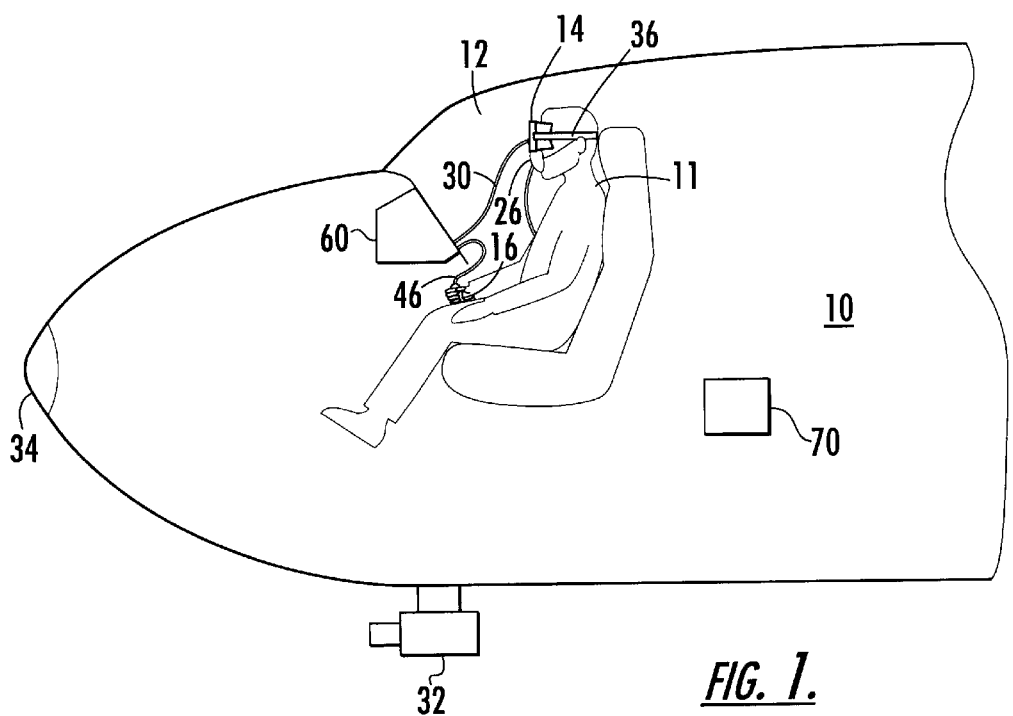
FIG. 1 is a schematic view of an emergency operating system according to an exemplary embodiment of the present invention.

FIG. 1 shows an emergency operating system according to an exemplary embodiment of the present invention, which permits piloting of an aircraft 10 in a smoke filled cockpit 12. The system generally comprises an airtight mask 14 that permits the pilot 11 to view minimum aircraft operating system information and external aircraft image scenes, and a hand-operated communication device 16 that enables the pilot 11 to communicate with air traffic controllers.

Figure 2A:
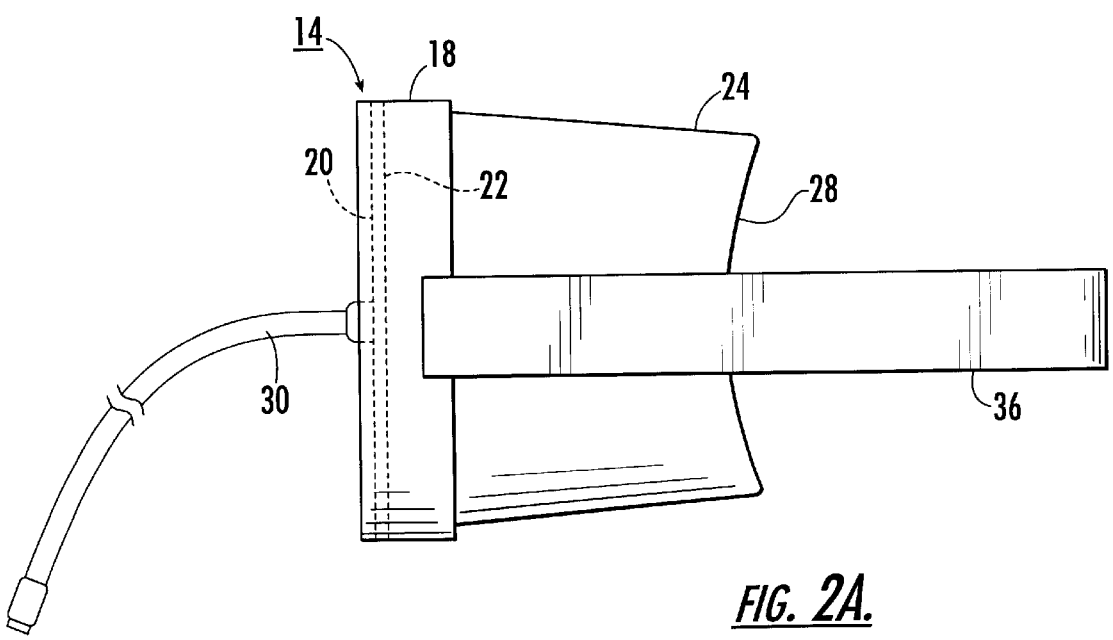
FIG. 2A is a side view of the mask of the system.
Figure 2B:
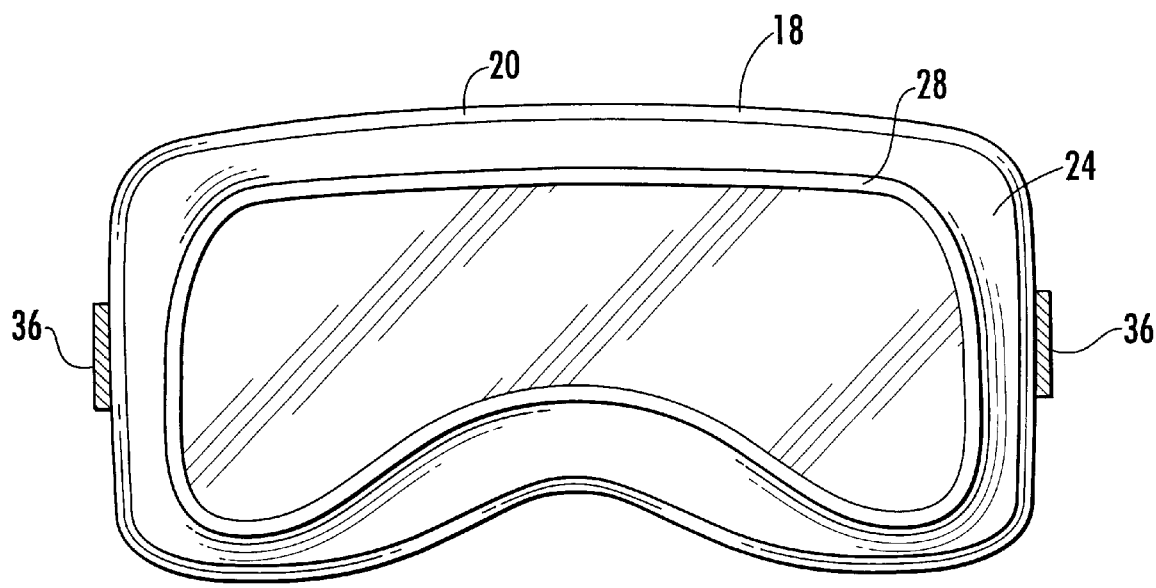
FIG. 2B is a rear view of the mask of the system.

FIGS. 2A and 2B show the mask 14 of the system in greater detail. The mask 14 generally includes a frame-like body 18 with a display screen 20 mounted in an opening (not visible) defined by the body 18 and a strap 36 connected to both sides (only one side shown) of the body 18. The display screen 20 has an internal surface 22 which displays minimum critical aircraft operating system information and external aircraft image scenes. The strap 36 is designed to extend around the back of the pilot's head or neck for securing the mask 14 against the pilot's face. A flexible band-shaped skirt 24 made from a relatively soft flexible material such as silicon, is attached to the rear side of the body 18. The flexible skirt 24 extends outwardly from the body 18 and is configured to surround the pilot's eyes without interfering with the aircraft's emergency oxygen mask 26 worn over the nose and mouth. Because the skirt 24 is made from a soft flexible material, its terminal peripheral edge 28 forms an airtight seal against the pilot's face. Consequently, substantially little smoke will flow in the space (defined within the skirt 24) between the internal surface 22 of the display screen 20 and the pilot's face.

A signal path 30 provides the display screen 20 of the mask 14 with appropriate signals from instrument display sources 60 (for aircraft operating system information) and external environmental sensing systems 32, 34 (for external aircraft image scene information) of the aircraft 10. The external environmental sensing systems depicted in FIG. 1 include an externally mounted video camera 32 and a radar system 34. The signal path 30 can also provide the display screen 20 with signals from other types of external environmental sensing systems used on aircraft such as optical scanner systems, infrared systems and any other system capable of generating environmental image display information in response to viewed conditions outside the aircraft.

Figure 3:
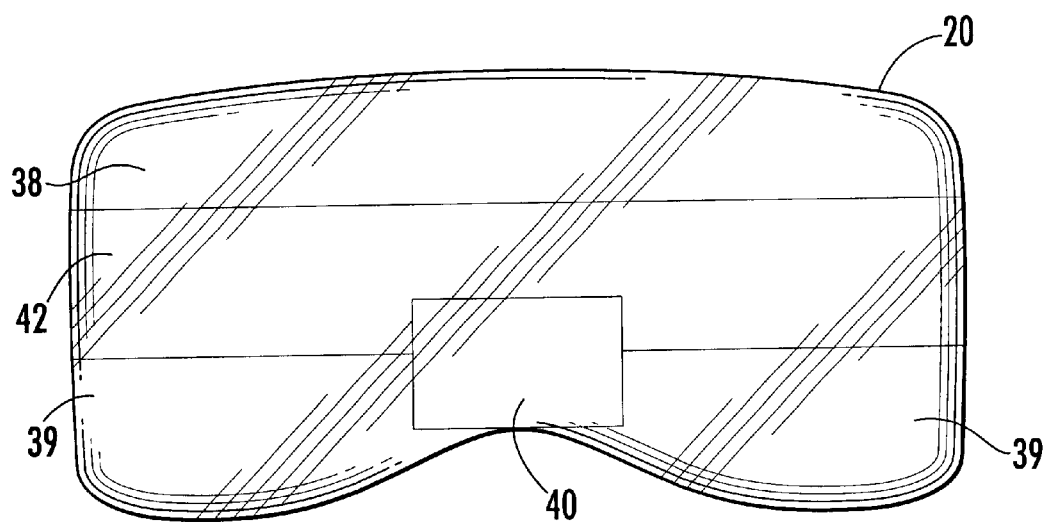
FIG. 3 is a front view of the display screen of the mask.

FIG. 3 shows the internal surface 22 of the display screen 20. The surface 22 is typically divided into upper and lower instrument display sections 38, 39, an aircraft external environment image display section 40 and a conventional viewing section 42. The instrument display sections 38, 39 are used for displaying minimum critical aircraft operating system information such as air speed, altitude, compass heading, rolling angle, pitching angle, path angle, landing gear, flaps, fuel and the like. The aircraft external environment image (AEEI) display section 40 displays external aircraft image scene information such as video, radar, and/or infrared images. In addition, the AEEI display section 40 can also display flight instructions and other related information transmitted from air controllers. The conventional viewing section 42 permits normal viewing within the cockpit in conditions where the smoke has not completely eliminated all visibility inside the cockpit.

The conventional viewing section 42 is typically implemented with a section of transparent glass or plastic. The instrument display sections 38, 39 can be implemented with one or more conventional LCD, digital, or like instrument displays and the AEEI display section 40 can be implemented with a conventional miniature video and/or radar screen. In other embodiments, image projection display methods and techniques can be used for projecting instrument display images, aircraft external environmental display images, and transmitted flight information display images on the internal surface sections 38, 39, 40 of the display screen 20. Examples of suitable image projection display methods can be seen in U.S. Pat. Nos. 5,113,177, 5,138,555 and 5,227,769, which are incorporated herein by reference for teaching such displays.

The signal path 30 can be implemented using any electrical and/or fiber optical signal transmission method and technique which is capable of transmitting the appropriate signals to the instrument and AEEI display sections 38, 39, 40 of the display screen 20. For example, the signal path 30 be embodied as a conventional electrical and/or fiber optic transmission cable. The terminal end of such a cable can be configured for permanent or temporary connection to the instrument display sources 60 and the external environmental sensing systems 32, 34 of the aircraft 10.

Figure 4:
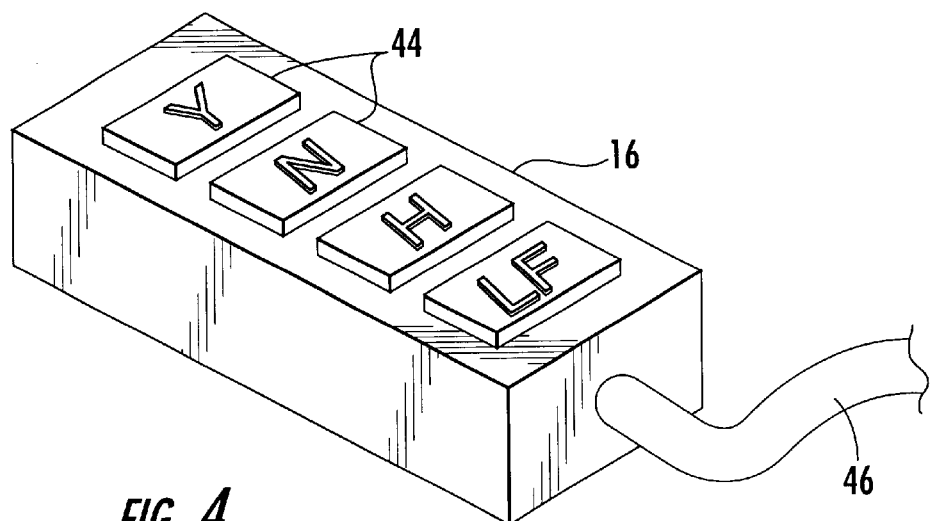
FIG. 4 is a perspective view of the hand-operated communication device of the system.

FIG. 4 shows the hand-operated communication device 16 of the system. The communication device 16 enables the pilot 11 to respond to a ground controller (not shown) when verbal communication is not possible (typically when breathing with the aid of the aircraft's emergency oxygen mask). The hand communication device 16 typically comprises a recording playback mechanism capable of storing and playing one or more pre-recorded messages which can be transmitted via the aircraft's radio transmission system. Since recording playback mechanisms of this type having the capability of playing back a pre-recorded message which can be transmitted via a standard radio transmission system are well known in the art, a further discussion of the technical details of such mechanisms is not deemed necessary.

The hand communication device 16 includes finger-operated buttons 44 for playing the appropriate pre-recorded message. The messages stored in the device 16 can include a single word such as "yes", "no", or "help", or a group of words such as "low on fuel" or "engine malfunction." Each button 44 corresponds to one of the stored messages. An electrical cable 46 coupled to the device 10 transmits the message to the aircraft's radio system for transmission to air traffic controllers.

Figure 5:
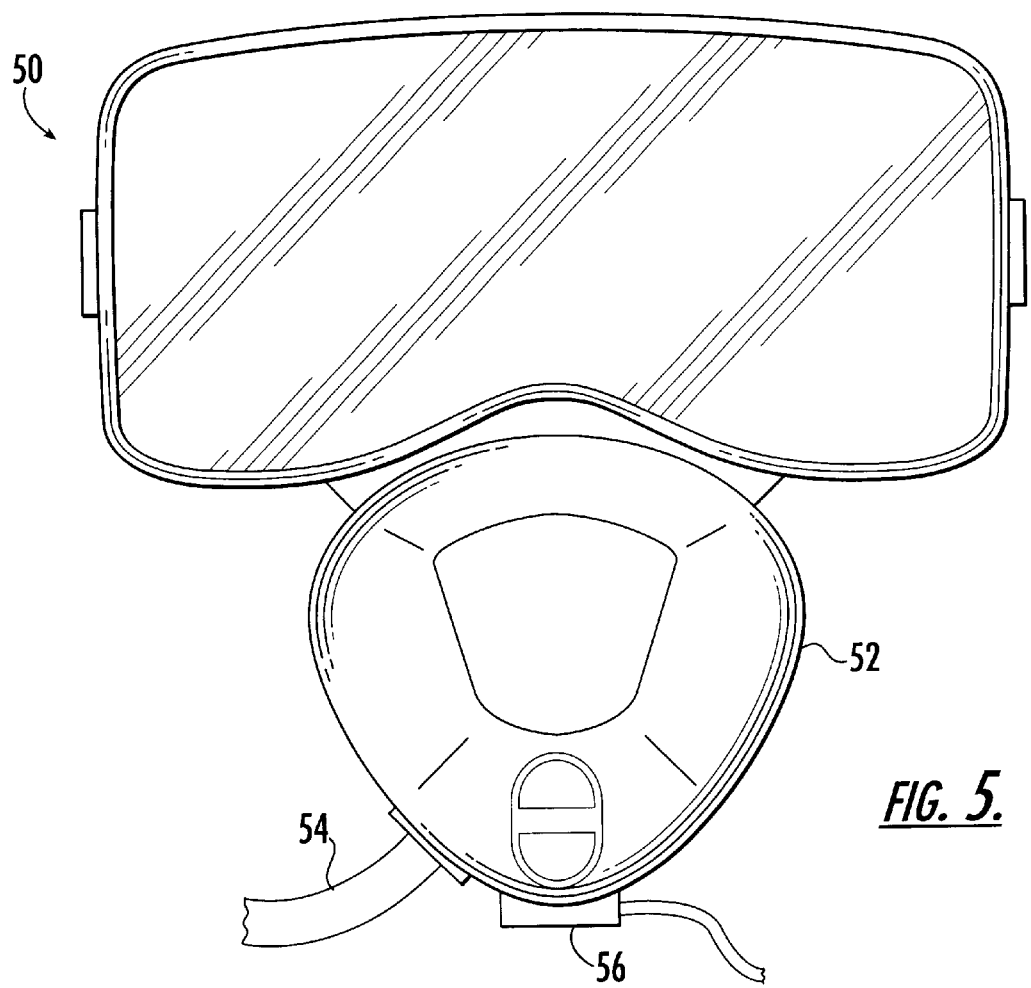
FIG. 5 shows a second embodiment of the mask of the system.

FIG. 5 shows a second embodiment of the mask 50 of the system. In this embodiment, emergency oxygen is provided by a respirator 52 that is built into the mask 50. The respirator 52 includes an oxygen supply line 54 that couples the respirator 52 to an external oxygen supply (not show). The respirator can include a microphone 56 which provides the pilot with the option of maintaining verbal communication with an air traffic controller.

As should be now apparent, the emergency operating system of the present invention will greatly enhance the safety of air travel because it enables a pilot to control an aircraft and communicate with air traffic controllers in conditions of reduced and/or no visibility caused by smoke in the aircraft's cockpit. Accordingly, pilots will be able to safely land the aircraft or at least provide a controlled crash landing of the aircraft which will advantageously minimize casualties and property losses.

Other embodiments of the system can include independently powered backup instruments 70 (FIG. 1) covering minimum critical aircraft operating conditions. The mask could then be connected to the backup instruments 70 in the event that the aircraft's instruments should become inoperable due to fire and/or electrical power interruption from the aircraft's integral system.

It should be understood that although the emergency operating system of the present invention is especially intended for use in piloting aircraft, it can also be used in other applications. For example, the system can be used for emergency operation of nuclear power facilities, aircraft carriers, and the like where smoke reduces or eliminates operator visibility.

While the foregoing invention has been described with reference to the above embodiments, various modifications and changes may be made without departing from the spirit of the present invention. Any such modifications and changes are considered to be within the scope of the claims.

What is claimed is:

1. A system for piloting an aircraft in a smoke filled cockpit of the aircraft, the system comprising a face mask configured to surround a pilot's eyes and form an airtight seal against the pilot's face, the face mask including a screen viewable by the pilot for displaying minimum aircraft operating system information and external aircraft image scenes, the display screen including signal path means for providing the display screen with signals from instrument display sources and external environmental sensing systems of the aircraft, the display screen includes a first section for displaying equipment instrument information from instrument display sources of the equipment, a second section for normal viewing through the face mask, and a third section for displaying external image information from external environmental sensing systems of the equipment, and a hand-operated communication device that enables non-verbal communication with an air traffic controller, the communication device includes recording playback means for storing and playing pre-recorded messages which can be transmitted by the aircraft's radio transmission system to the air traffic controller, wherein the communication device being operable during an emergency situation when said smoke fills said cockpit and vision of said pilot is obscured.

2. The system according to claim 1, wherein the communication device includes finger-operated buttons for selectively playing the pre-recorded messages.

3. The system according to claim 1, further comprising a respirator integral with the mask that provides oxygen to the user.

4. The system according to claim 3, wherein the respirator includes a microphone for maintaining verbal communication with an air traffic controller.

5. The system according to claim 1, further comprising independently powered backup instruments covering minimum critical aircraft operating conditions, coupled to the mask by the signal path means.

* * * * *